INVENTORS.
PETER J. CLIFFORD &
BY ROBERT E. JONES

Tweedale & Gerhardt
ATTORNEYS.

INVENTORS.
PETER J. CLIFFORD &
BY ROBERT E. JONES

Tweedale & Gerhardt
ATTORNEYS.

INVENTORS.
PETER J. CLIFFORD &
BY ROBERT E. JONES

Tweedale & Gerhardt
ATTORNEYS.

United States Patent Office 3,223,178
Patented Dec. 14, 1965

3,223,178
DISC HARROW
Peter J. Clifford and Robert E. Jones, Fresno, Calif., assignors to Massey-Ferguson Inc., Detroit, Mich.
Filed June 3, 1964, Ser. No. 372,280
9 Claims. (Cl. 172—582)

This invention relates to disc harrows and more specifically to disc harrows particularly suitable, although not exclusively, for use in cultivating vineyards and orchards.

Irrigation furrows of different cross section are required during various stages of cultivation of vineyard and orchard rows, and not infrequently, the width of the rows varies considerably.

An object of this invention is to provide a disc harrow adjustable over a wide range to change the cutting width.

Another object is to provide a tandem disc harrow in which the disc gangs are selectively adjustable about vertical and horizontal axes to vary the cutting angle of the blades and the tilt angle of the gangs.

Yet another object is to provide a tandem disc harrow in which the cutting width, disc angle and tilt angle can be independently adjusted over a wide range.

Still another object is to provide a tandem disc harrow having a reversible hitch frame permitting the harrow to be towed in opposite directions.

In achievement of the foregoing, and other objects, the disc gangs are mounted on a support bracket in such a manner that they can be selectively tilted about a horizontal axis relative to the support brackets. In turn, each support bracket is carried on a frame member in such a manner that it can be selectively rotated about a vertical axis to change the disc angle and can be adjusted along the length of its associated frame member to change the cutting width.

Other objects and advantages of the invention will become apparent from the following description taken in connection with the accompanying drawings in which:

FIG. 3 is a sectional detail view taken on line 3—3 of FIG. 2;

FIG. 4 is an enlarged plan view of one of the disc gang support brackets;

FIG. 5 is a view taken along line 5—5 of FIG. 4;

Figure 1:
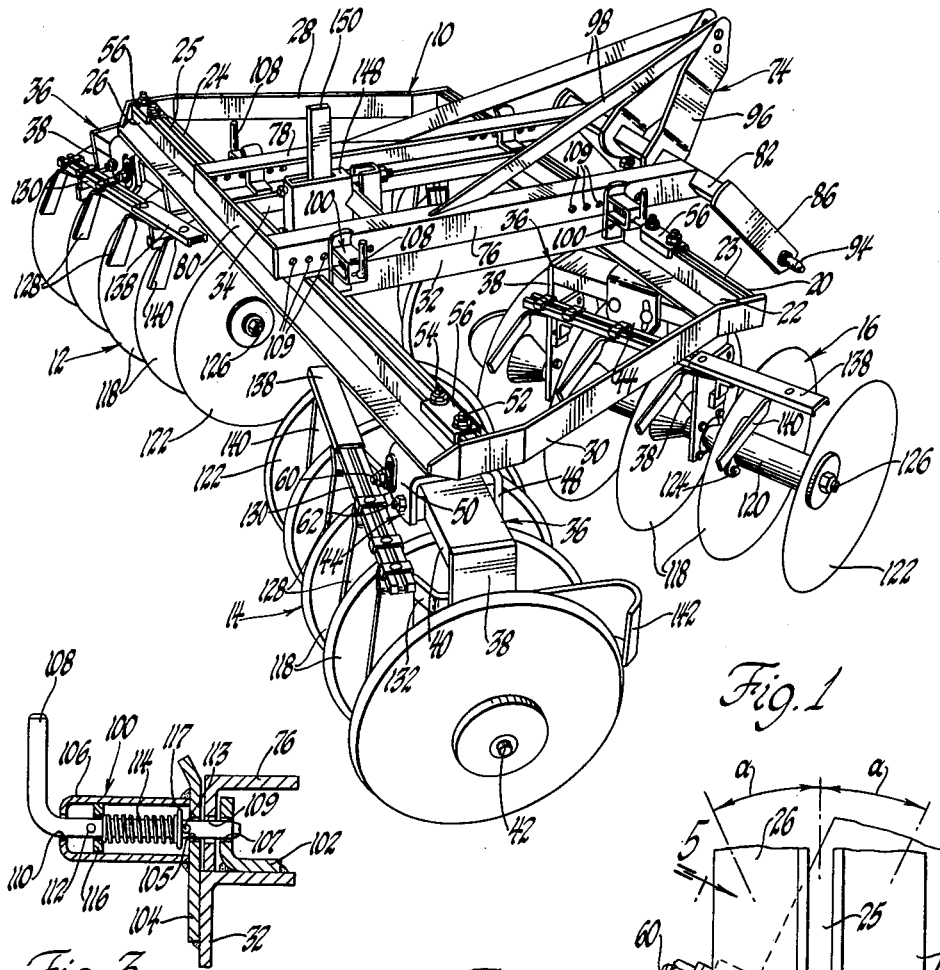
FIG. 1 is a perspective view of a tandem disc harrow embodying the invention in its preferred form.
Figure 2:
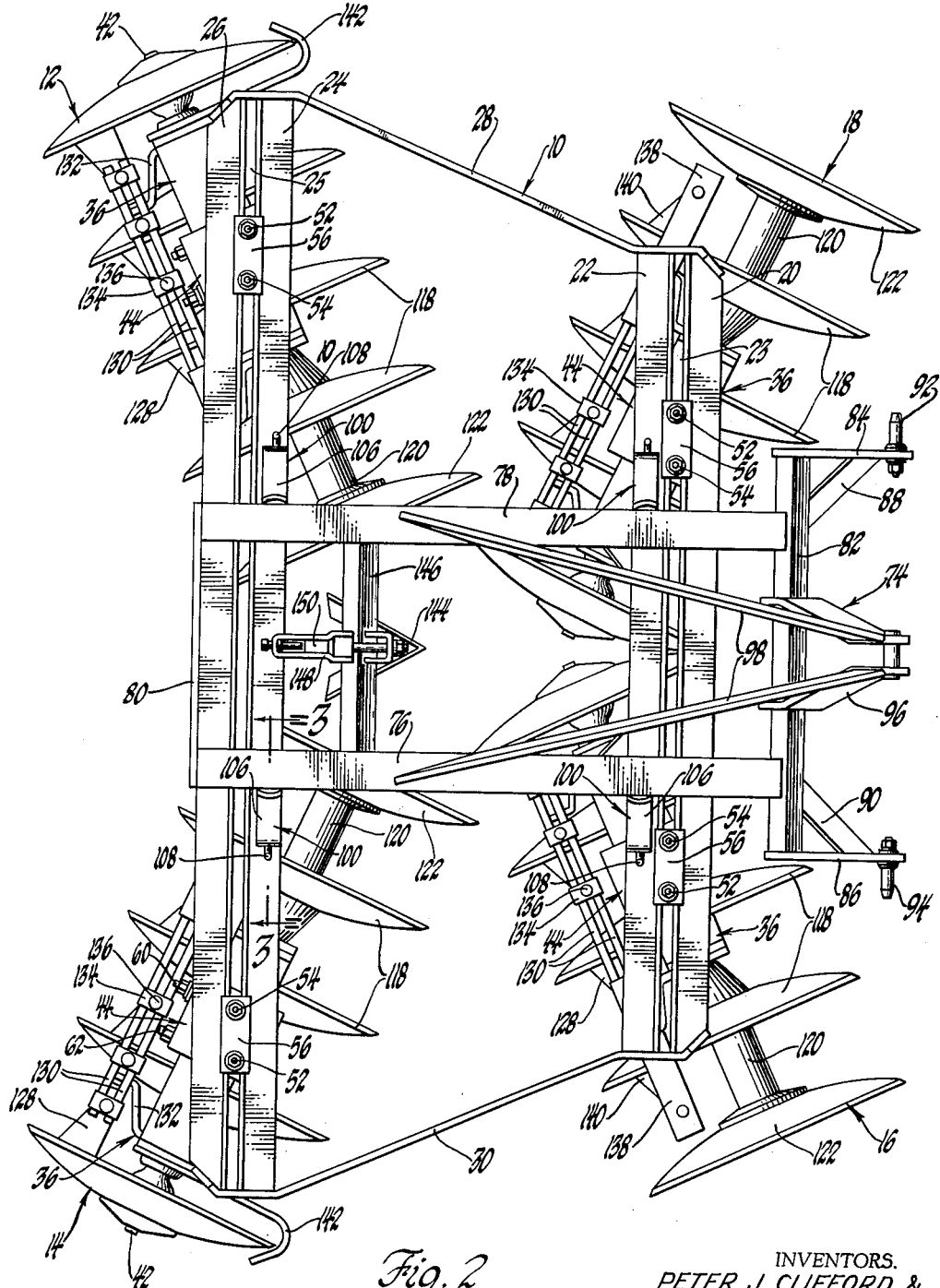
FIG. 2 is a plan view of the harrow of FIG. 1.

With reference particularly to FIGURES 1 and 2, reference numeral 10 designates generally a carrier frame for four disc gangs 12, 14, 16 and 18. Carrier frame 10 is formed with a front frame member made up of a pair of angle members 20 and 22 and a rear frame member made up of a pair of angle members 24 and 26. The front and rear frame members are connected together at their ends by side braces 28 and 30. Frame members 20 and 22, as well as frame members 24 and 26, have their vertical flanges in opposed, spaced relationship to define guide slots 23 and 25, respectively, therebetween. Central frame members 32 and 34 (FIG. 1) extend from front to rear between frame members 22 and 24.

Each of the disc gangs are carried by a gang frame 36 having a pair of vertical leg members 38 depending from the ends of a horizontal portion 40. The bearing housings for axle shafts 42 of the disc gang are accommodated in suitable recesses (not shown) in vertical legs 38.

Each gang frame 36 is secured to its respective front or rear frame members 20, 22 and 24, 26 by a gang support bracket 44. A typical one of the four support brackets is illustrated in FIGS. 4 and 5 and is formed with a top wall 46 and depending side walls 48 and 50. Bolts 52 and 54 extend through top wall 46 into slot 25 and are attached to a U-shaped clamp or guide bracket 56 by nuts 53 and 55. Guide bracket 56 is formed with vertical legs 57 (FIG. 5) which embrace the opposed vertical flanges of the angle frame members 24 and 26 on each side of guide slot 25.

As shown in FIGURE 4, top wall 46 of bracket 44 is formed with an arcuate slot 58 through which bolt 52 extends. Slot 58 coincides with the arc of a circle having its center at the axis of bolt 54. Consequently, by loosening nuts 53 and 55, bracket 44 can be rotated about bolt 54 throughout the arcuate length of slot 58. The horizontal portion 40 of gang frame 36 is received between side walls 48 and 50, and is secured thereto by bolts 60 and 62. Bolt 60, as shown in FIG. 5, is received in aligned, arcuate slots 64 formed in side walls 48 and 50. Slots 58 and 64 lie on arcs of circles having centers at the axes of bolts 62 and 54, respectively. The peripheries of slots 58 and 64 are serrated at 66 and 68, respectively, and serrated lock washers 70 and 72, respectively, cooperate with serrations 66 and 68 to lock bolts 50 and 62 in selected positions along the length of their associated slots.

By loosening nut 53 on bolt 52 and rotating support bracket 44 about the axis of bolt 54, the cutting angle a (FIG. 4) of the gangs can be varied, for example, up to 25 degrees on either side of the axis of slot 23 in the illustrated embodiment. Similarly, the tilt angle b (FIG. 5) can be adjusted approximately 10 degrees above or below the horizontal axis x as shown in FIG. 5. By loosening bolts 52 and 54, brackets 44, as well as gang frames 36, can be adjusted along the length of slots 23 and 25 to vary the cutting width from a minimum width of 6 feet 6 inches to a maximum width of 8 feet 6 inches. The foregoing values are given by way of example only, and are not to be construed in a limiting sense. It should be noted that the disc gang can be adjusted relative to the support bracket without affecting the position of the support bracket 44 relative to frame members 24, 26 or 20, 22, and that bracket 44 can be adjusted about the vertical axis of bolt 54 without affecting the angular position of the disc gang relative to support bracket 44.

Mounted on carrier frame 10 is a hitch frame assembly 74 suitable for attachment with a three-point hitch mechanism of a tractor. Hitch frame assembly 74 includes a pair of side frame members 76 and 78 with their opposite ends secured together by a rear frame member 80 and a cross bar 82. Cross bar 82 is of non-circular cross section and has mounted on its outer ends a pair of hitch brackets 84 and 86. Hitch pins 92 and 94, respectively, project from the outer ends of brackets 84 and 86. Braces 88 and 90 extend diagonally between the outer ends of brackets 84 and 86 and cross bar 82. Welded or otherwise secured to the center portion of draw bar 82 is a top link hitch member 96. Brace members 98 extend between hitch member 96 and side frame members 76 and 78.

Referring primarily to FIGURES 1, 2 and 3, hitch frame assembly 74 can be adjusted longitudinally with respect to the carrier frame 10, and can also be reversed with respect to the carrier frame by means of a releasable latch arrangement. Identical latch assemblies 100 are mounted at each end of central frame members 32 and 34 of carrier frame 10. The latch assembly 100 shown in FIG. 3 includes a supporting plate member 104 having an aperture 105 therein and welded to the outer wall of central frame member 32. Mounted on the upper surface of frame member 32 is an angle bracket 102 having an aperture 107 formed in its vertical leg. Side frame member 76 of the hitch frame has its depending vertical leg portion received in the slot defined between plate 104 and the vertical leg of bracket 102. Welded to the outer surface of plate 104 is a U-shaped spring housing 106 having a key hole slot 110 formed in its end wall.

The vertical, depending wall of side frame member 76 (FIG. 3) is formed with a series of apertures 109 which can be brought into alignment with the opposed apertures 105 and 107 in plate 104 and bracket 102, respectively, by sliding the hitch frame assembly longitudinally relative to carrier frame 10. When an opening 109 is brought into registry with apertures 105 and 107, the carrier frame can be locked in position by means of a latch pin 108 extending through the aligned openings 105, 109 and 107. Pin 108 is biased to the latched position by means of a spring 114 seated between a pair of washers 116 and 117 held by spring 114 in engagement with a pair of pins 112 and 113 on latch pin 108. By pulling outwardly on latch pin 108 until pin 112 clears the key hole slot 110, the latch pin will be retracted from openings 109 and 107. By rotating pin 108 until pin 112 is out of alignment with the key hole slot, pin 112 will engage the end wall of bracket 106 to hold latch pin 108 in its retracted position.

By retracting the four latch pins 108, the entire hitch frame assembly 74 can be detached from the carrier frame. The series of holes 109 in frame members 76 and 78 permit the hitch frame to be adjusted longitudinally on the carrier frame to position the implement and its center of gravity as near as possible in the rear axle of the tractor, depending upon the size of the rear tires. For example, holes 109 in the illustrated embodiment permits eight inches of longitudinal adjustment in two inch increments.

Each of disc gangs 12, 14, 16 and 18 in the illustrated embodiment includes a basic unit of four blades 118 as well as a disc gang extension in the form of a detachable spindle 120 having an additional blade 122 mounted thereon. Spindle 120 is bolted to the hub of the concave side of the disc at the end of the gang shown at 124 on disc gang 16 in FIG. 1. Disc 122 is mounted on a shaft 126, preferably of non-circular cross section, and disc 122, spindle 120 and discs 118 rotate as a unit about the common axis of shafts 42 and 126.

Figure 6:
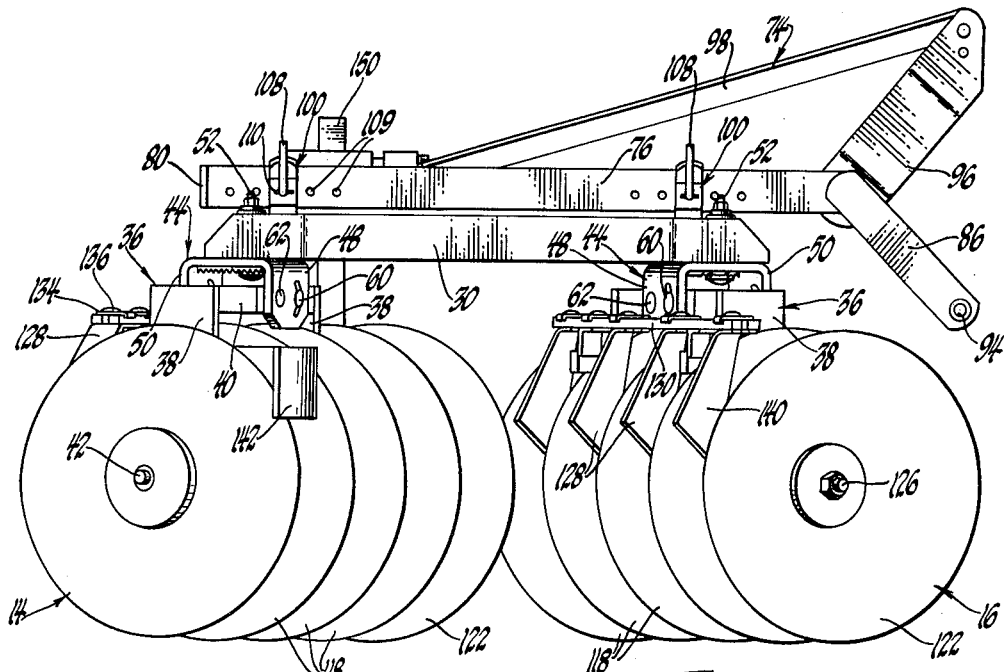
FIG. 6 is an end view taken from the right hand end of FIG. 1.
Figure 7:
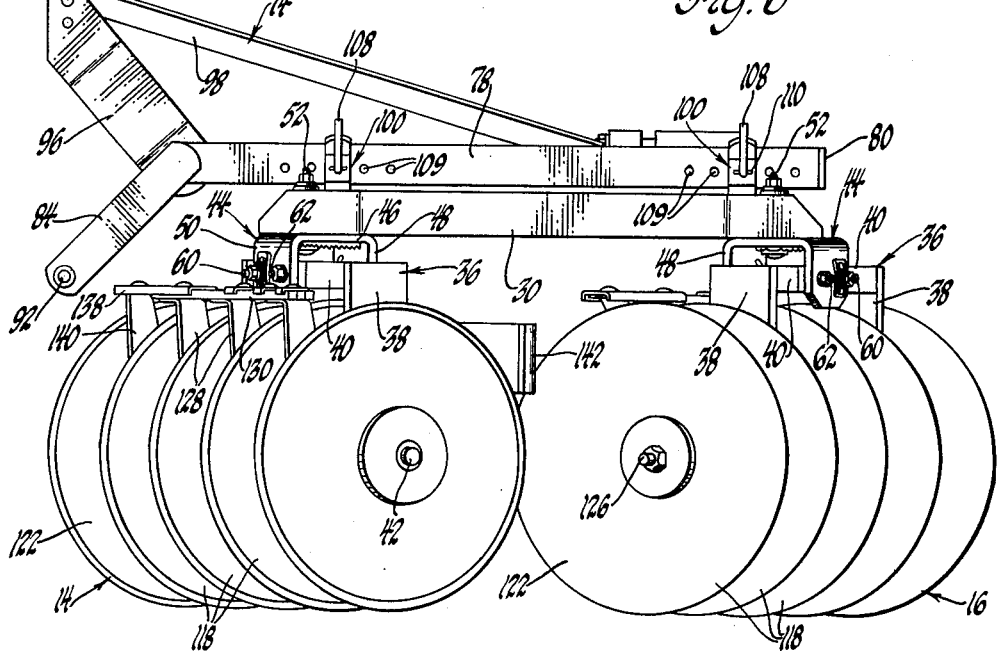
FIG. 7 is a view similar to FIG. 6 with the disc gangs arranged in a diamond configuration and with the hitching frame reversed.

Scrapers 128 (FIGS. 1, 6 and 7) are adjustably mounted on a pair of square rods 130 (FIG. 2) carried by brackets 132 which in turn are welded to gang frame 36 (FIG. 2). Scrapers 128 are secured to rods 130 by clamps 134 and a suitable fastener such as a screw or bolt 136. Slidably mounted on rods 130 is a scraper bar extension 138 having an additional scraper 140 mounted thereon for cooperating with the concave face of the disc 118 adjacent spindle 120 when the gang extension is attached. Scraper bar 140 may also be provided to clean the exposed concave end of the disc gang in adhesive soils. A wrap-around tree guard 142 may be connected with the gang frame vertical legs 38 to protect the exposed convex end of the gangs as shown particularly in FIGS. 1 and 2.

Hitch frame 74 is attached for towing the harrow toward the right as viewed in FIG. 2. Gangs 16 and 18 are the forward gangs and are adjusted to the outthrow position, i.e., they are oriented to throw dirt away from the line of draft. Gangs 12 and 14 are the rear gangs and are adjusted to the inthrow position, i.e., to throw dirt toward the line of draft. With the gangs arranged as shown in FIG. 2, the ground will be left level in the center with furrows formed at the outer edges of the swath.

Figure 8:
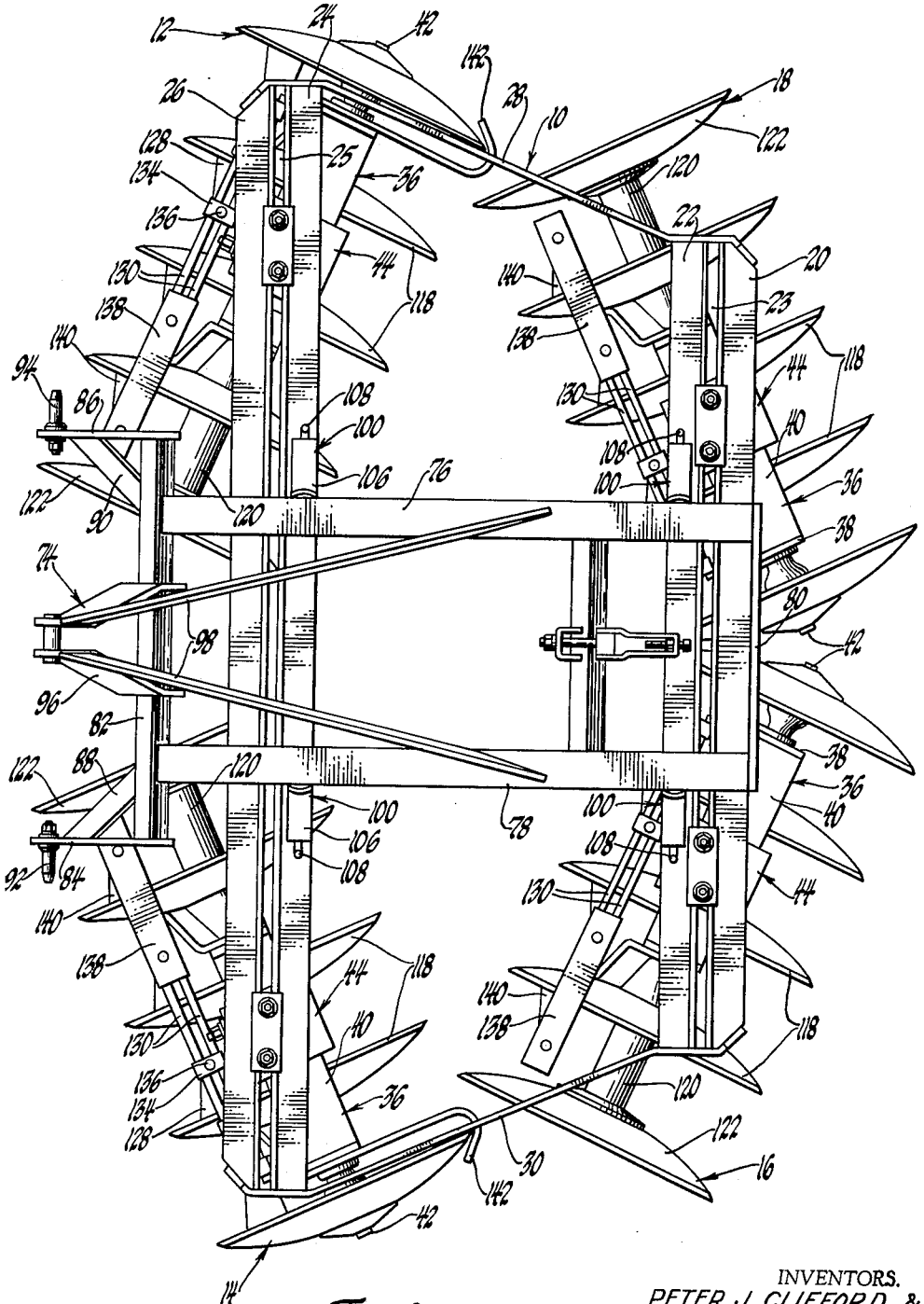
FIG. 8 is a plan view of the harrow in the configuration shown in FIG. 7.

The hitch frame is reversed in FIG. 8 with the gangs arranged in diamond configuration with gangs 12 and 14 the leading gangs. In this configuration, a single furrow will be formed at the center of the swath.

Since there is a space between the inner ends of the disc gangs, a portion of the soil will be undisturbed by the discs. In order to break up this undisturbed soil, a V-sweep 144 (FIG. 2) may be detachably clamped to an auxiliary tool bar 146 of hitch frame 74. Clamp 148 on tool bar 146 secures standard 150 of V-sweep 144 to the auxiliary tool bar.

With the foregoing construction, the gangs can be adjusted to provide the required irrigation furrow cross section between vineyard and orchard rows during various stages of cultivation. Generally, the area between the vines or trees can be tilled with one pass of a tandem, while it normally takes two passes of an offset disc harrow. Either plain or notched disc blades may be employed with the gangs as desired.

We claim:

1. In a disc harrow, a carrier frame including a pair of frame members having opposed vertical flanges disposed in spaced, parallel relationship to define a guide slot therebetween, a guide bracket mounted on said vertical flanges for sliding movement along said guide slot, a disc gang support bracket connected with said guide bracket on the opposite side of said frame members from said guide bracket, fastening means for permitting limited pivotal movement about a vertical axis relative to said guide member and for locking said guide bracket and support bracket against movement along said guide slot, and a disc gang mounted on said support bracket for limited pivotal movement relative to said support bracket about a horizontal axis.

2. In a disc harrow adapted to be connected in trailed relationship to a tractor, a frame member extending transversely of the draft line, a guide bracket slidably supported on said frame member, a gang support bracket having a top wall connected with said guide bracket for pivotal movement relative to said guide bracket about a vertical axis, means for locking said support bracket in a selected one of a plurality of angular positions relative to said guide bracket, a pair of depending side walls on said support bracket, a disc gang frame member received between said side walls, means connecting said gang frame member with said side walls for pivotal movement about a horizontal axis, and means for locking said gang frame in a selected one of a plurality of angular positions relative to said support bracket.

3. In a disc harrow adapted to be connected in trailed relationship to a tractor, a carrier frame member having a guide slot extending transversely of the draft line, a guide bracket slidably mounted in said guide slot, a disc gang support bracket having a top wall and a pair of depending side walls, a gang frame member received between said depending side walls, a first pair of bolts connecting said support bracket with said guide wall to clamp said carrier frame member between the guide bracket and the top wall of the support bracket, a second pair of bolts connecting said gang frame members to the side walls of said support bracket, an arcuate slot in the top wall and aligned arcuate slots in the side walls of the support bracket, one of said first pair of bolts extending through the arcuate slot in the top wall permitting limited pivotal adjustment of said support bracket relative to said guide bracket, and one of said second pair of bolts extending through the aligned arcuate slots in the side walls of the support bracket permitting limited pivotal adjustment of said gang frame member relative to said support bracket.

4. The construction defined in claim 3 further including serrations formed in said top and side walls at the peripheries of said arcuate slots, and lock washers having complementary serrations carried by the associated bolts received in said slots to selectively lock said gang frame, support bracket and guide bracket together.

5. In a disc harrow adapted to be connected in trailed relationship to a tractor, a carrier frame having front and rear horizontal frame members extending transversely of the line of draft, a pair of support brackets mounted on each of said front and rear frame members for sliding movement along the length of the frame members as well as pivotal movement relative to the frame members about a vertical axis, a pair of depending vertical legs on each of said support brackets, a disc gang supported in each of said support brackets between said vertical legs for pivotal movement relative thereto about a horizontal axis, means for locking said support bracket in selected positions on said carrier frame member against pivotal and sliding movement relative thereto, and means for locking said disc gang in selected positions on said support bracket against pivotal movement relative thereto.

6. The construction defined in claim 5 further including a pair of central frame members on said carrier frame extending between said front and rear frame members parallel to the line of draft, a hitch frame having side frame members slidably supported on said central frame members, a cross bar mounted between said side frame members, a draft hitch mounted on said cross bar, and latch means on said central frame members engageable with said side frame members for detachably securing the hitch frame to the carrier frame.

7. In a tandem disc harrow including a carrier frame having front and rear frame members extending transversely of the longitudinal axis and a pair of reversible disc gangs carried by each of said front and rear frame members, a pair of central frame members extending longitudinally between said front and rear frame members, a hitch frame having side frame members slidably supported on the central frame members of said carrier frame, a series of longitudinally spaced apertures adjacent each end of each side frame member, a latch assembly having a spring loaded plunger mounted adjacent each end of each of said central frame members, said plunger being selectively engageable with one of said apertures to detachably secure said hitch frame to said carrier frame, a cross bar extending between said side frame member adjacent one end thereof, and a draft hitch mounted on said cross bar.

8. In a disc harrow having a carrier frame including a transverse frame member, a support bracket mounted on said frame member, a disc gang mounted on said support bracket, means for pivotally adjusting said support bracket relative to said frame member about a vertical axis, and means for pivotally adjusting said disc gang relative to said support bracket about a horizontal axis, said support bracket being adjustable about said vertical axis without affecting the position of said disc gang relative to said support bracket, and said disc gang being adjustable about said horizontal axis without affecting the position of said support bracket relative to said frame member.

9. In an earth working implement having a carrier frame for supporting earth working tools thereon, a pair of parallel longitudinal frame members centrally located on said carrier frame, a hitch frame having side frame members slidably supported on said central frame members, and latch means detachably securing the side frame members of said hitch frame to the central frame members of said carrier frame permitting the hitch frame position to be reversed relative to said carrier frame.

References Cited by the Examiner

UNITED STATES PATENTS

| | | | |
|---|---|---|---|
| 553,100 | 1/1896 | Brunnemer | 172—600 X |
| 931,928 | 8/1909 | Hulce | 172—600 |
| 1,245,295 | 11/1917 | Willis | 172—585 |
| 1,247,017 | 11/1917 | Sharp | 172—595 X |
| 1,746,092 | 2/1930 | Sutton. | |
| 2,708,333 | 5/1955 | Cooney | 172—582 |
| 2,798,420 | 7/1957 | Ewalt | 172—600 |
| 2,973,819 | 3/1961 | Simmons | 172—600 |
| 3,019,032 | 1/1962 | Oehler et al. | 280—478 |
| 3,039,541 | 6/1962 | Harden et al. | 172—677 |
| 3,107,737 | 10/1963 | Van Sickle et al. | 172—596 X |

ABRAHAM G. STONE, *Primary Examiner.*

T. GRAHAM CRAVER, *Examiner.*